United States Patent
Shaukat

(10) Patent No.: US 7,422,130 B2
(45) Date of Patent: Sep. 9, 2008

(54) RETRACTABLE CROSS RAIL FOR VEHICLE ROOF RACK

(75) Inventor: Mobeen Shaukat, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 574 days.

(21) Appl. No.: 11/073,449

(22) Filed: Mar. 7, 2005

(65) Prior Publication Data

US 2006/0196905 A1    Sep. 7, 2006

(51) Int. Cl.
*B60R 9/00* (2006.01)

(52) U.S. Cl. ............... 224/316; 224/321; 224/326; 224/309; 224/315

(58) Field of Classification Search ............ 224/316, 224/321, 326, 309, 210, 37.7, 314, 315
See application file for complete search history.

(56) References Cited

U.S. PATENT DOCUMENTS

| | | | | |
|---|---|---|---|---|
| 5,016,858 A | * | 5/1991 | Mitchell | 254/45 |
| 5,511,709 A | * | 4/1996 | Fisch | 224/321 |
| 5,971,684 A | * | 10/1999 | Wang | 410/107 |
| 6,029,873 A | * | 2/2000 | Won et al. | 224/321 |
| 6,468,009 B2 | * | 10/2002 | Elwell et al. | 410/107 |
| 6,769,728 B2 | * | 8/2004 | Albaisa et al. | 296/37.7 |
| 6,901,874 B2 | * | 6/2005 | Lo | 114/218 |
| 2004/0013996 A1 | * | 1/2004 | Sapian | 433/18 |
| 2004/0195866 A1 | * | 10/2004 | Fin | 296/210 |

FOREIGN PATENT DOCUMENTS

| | | | |
|---|---|---|---|
| DE | 3906196 A2 | * | 8/1990 |
| WO | WO 97/18973 | * | 5/1997 |

* cited by examiner

*Primary Examiner*—Nathan J Newhouse
*Assistant Examiner*—Lester L Vanterpool
(74) *Attorney, Agent, or Firm*—Ralph E. Smith

(57) ABSTRACT

A vehicular roof rack system has a cross bar that employs a base member, a top member that is retractable to a position within the base member, a spring for biasing the top member away from the base member, and a spring case encompassing the spring to limit spring extension and thus protraction of the top member. The spring case is a two-piece case within which the spring biases against the base member when the top member is in its stowed position to place the top member in its protracted position. The top member and the base member fit together in the retracted position to form an aerodynamic part to permit the cross bar to reduce drag and wind noise when moved through a medium. When protracted, the top member and the bottom member define a gap therebetween so that cargo to be secured can be tied to the top member.

16 Claims, 5 Drawing Sheets

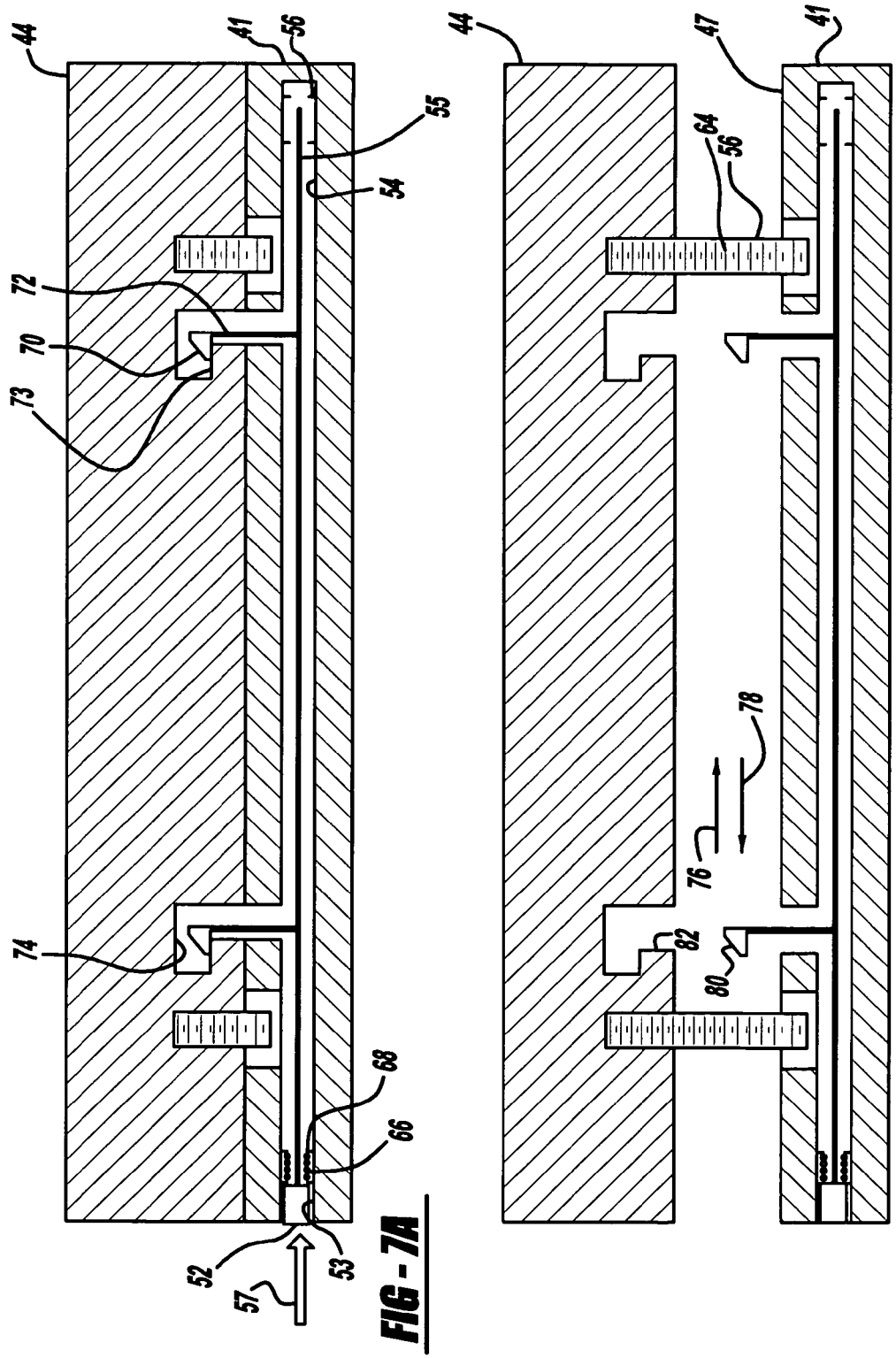

RETRACTABLE CROSS RAIL FOR VEHICLE ROOF RACK

FIELD OF THE INVENTION

The present invention relates to a vehicular roof rack, and more specifically, to a retractable cross bar of a vehicle roof rack system.

BACKGROUND OF THE INVENTION

Vehicle manufacturers and suppliers alike are constantly striving to improve the roof top cargo carrying capability of vehicles. Part of this initiative is increasing the ability of vehicular roof rack system to efficiently carry a roof top load as the vehicle moves through air. More specifically, there is an initiative on behalf of vehicle manufacturers and suppliers to design roof rack systems that are aerodynamically efficient and reduce drag, that reduce wind noise, and that eliminate the need for longitudinal rails, otherwise known as side roof rack rails.

Conventionally, vehicular roof rack systems include two longitudinal side rails and at least one cross bar, all fixed to the roof of the applicable vehicle in a non-retractable fashion, that is, all rails are fixed and visible at all times. Variations of this conventional system include tubular structures in a variety of geometric configurations. While these current roof rack systems have proven to be satisfactory for their applications, advancing the relevant art remains desirable.

SUMMARY OF THE INVENTION

A roof rack cross bar of an automobile has a base member, a top member that is retractable to a first position within the base member and that also is protractible to a second position above the base member. A spring biases the top member away from the base member and a spring case encompasses the spring to limit extension of the spring and thus limits protraction of the top member. The spring case may be a rigid or soft one piece or two-piece case.

There is a release rod, wherein a first end of the release rod is coupled to the spring and a second end of the release rod is coupled to a push button, both resident within the base member. The spring biases against the base member to move the top member from its stowed position toward its protracted position. The spring case limits the amount of protraction of the top member. A leading surface of the base member has a slope that is different than a slope of a trailing surface of the base member to provide aerodynamic advantages, such as reducing drag and wind noise. The top member and the bottom member define a gap therebetween when the top member is in its protracted position to permit securing of cargo to the top member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7A is a cross-sectional view of the roof rack cross bar depicting a latching mechanism with the bar in its retracted and latched position; and FIG. 7B is a cross-sectional view of the roof rack cross bar depicting the latching mechanism with the bar in its protracted and unlatched position.

DETAILED DESCRIPTION OF THE PREFERRED EMBODIMENTS

The following description of a retractable roof rack system is merely exemplary in nature and is not intended to limit the invention, its application or uses. Moreover, while the present invention is described in detail below generally with respect to an automotive exterior application, it will be appreciated by those skilled in the art that the teachings of the present invention are clearly not limited to only an automotive application, and may be applied to various other types of vehicles where securing items for transport is desired, as further discussed herein.

As noted above, since many vehicle roof racks are permanently fixed, they may be bulky and aesthetically unpleasing to those viewing the exterior of the automobile, which can detract from the overall vehicle aesthetics. Additionally, exterior-mounted roof racks increase wind resistance across the surface on which they are mounted, and as a result, generally increase the overall wind resistance of the vehicle on which they are installed. Furthermore, wind noise is increased on vehicles possessing exposed and non-aerodynamic roof racks relative to those that are not exposed or aerodynamic. Moreover, some roof racks may become damaged when they are passed through automatic car washes, which can limit the opportunities for a vehicle to be cleaned.

Some removable roof racks, whether supplied with the original equipment or supplied in the aftermarket, also suffer from many problems. While some roof racks may be removable, they may be cumbersome to remove and re-install. Thus, a need exists for a vehicular roof rack for securing cargo that does not suffer from the above disadvantages. Reference will now be made in detail to preferred embodiments of the invention. Wherever possible, like reference numbers are used throughout the drawings to refer to like parts or structures.

Figure 1:
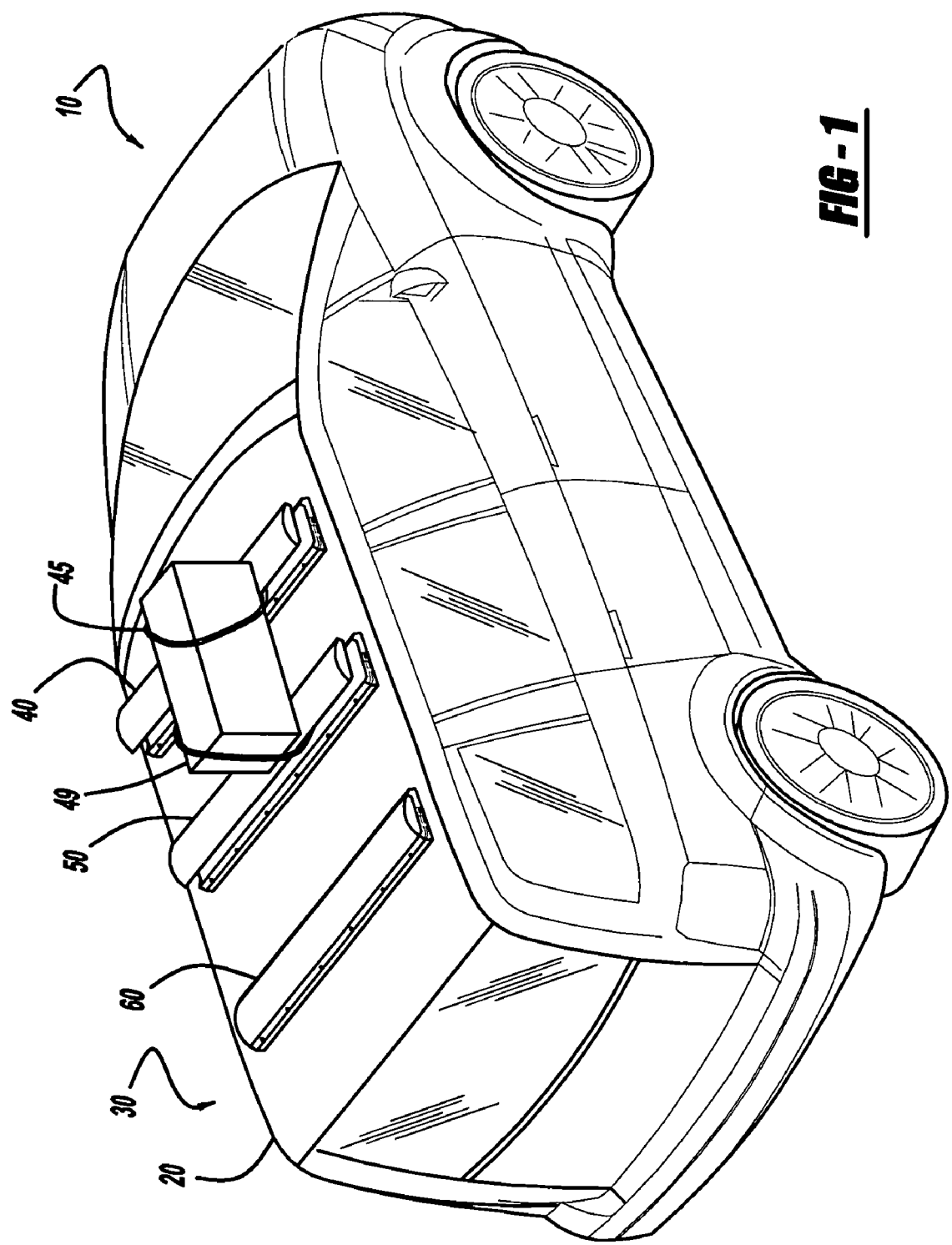
FIG. 1 is a perspective view of an automobile exterior depicting the location of a retractable roof rack system according to the teachings of the present invention.
Figure 2:
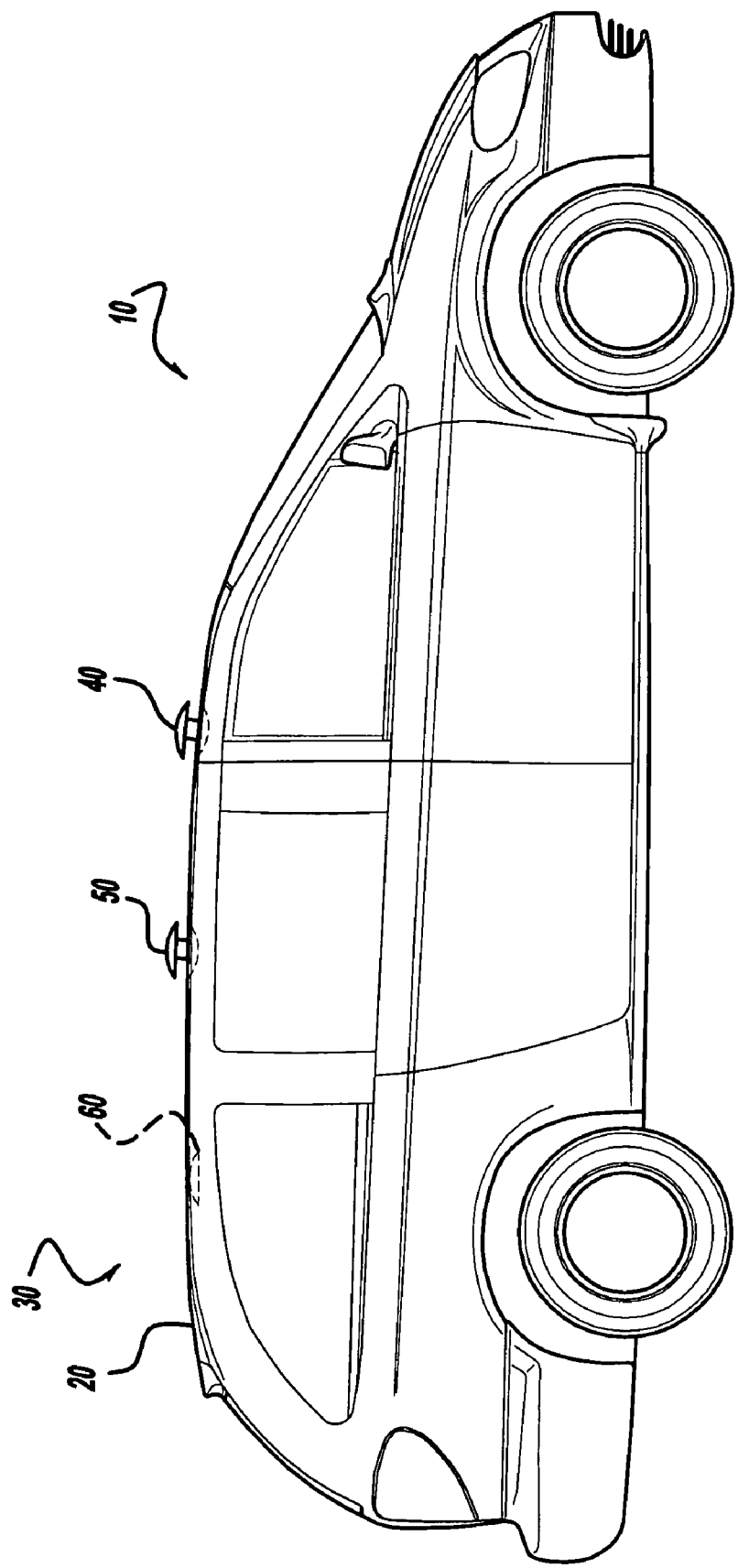
FIG. 2 is a perspective side view of an automobile exterior depicting the location of a retractable roof rack system according to the teachings of the present invention.
Figure 3:
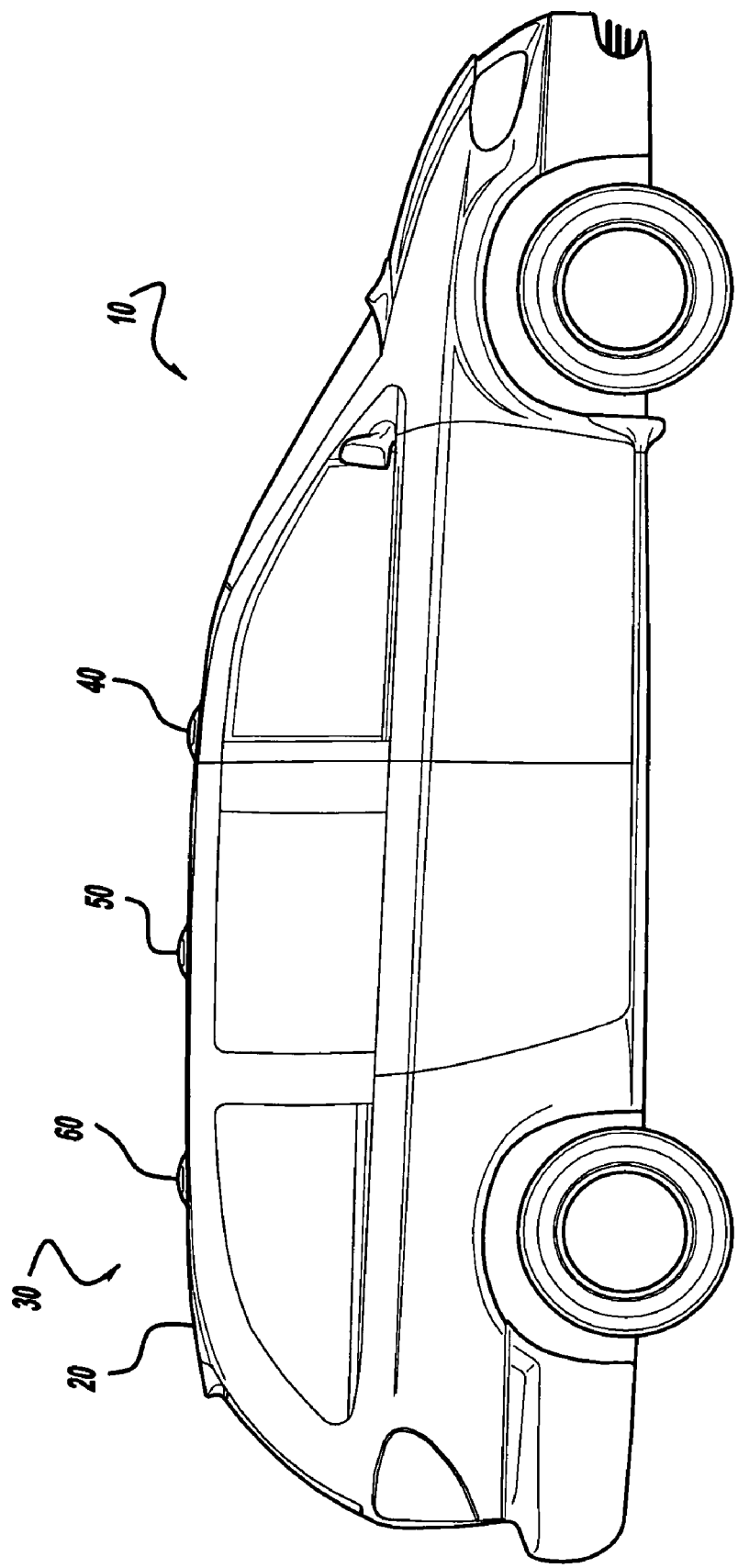
FIG. 3 is a perspective side view of an automobile exterior depicting the location of a retractable roof rack system according to the teachings of the present invention.

With reference to FIGS. 1 through 3, an automobile 10 is depicted showing a representative example of the various locations of a roof rack cross bar 40, 50 and 60 that are each part of and together form a roof rack system 30 resident on an automobile roof 20. While the roof rack system 30 is shown on a roof of a vehicle 10, the roof rack system 30 could also be applied to a trunk lid of a vehicle or even a hood of a vehicle, depending upon the desired application. Additionally, while the cross bars 40, 50 and 60 are generally described as being useable on the exterior of the vehicle 10, their use can be expanded to the interior of the vehicle 10 to secure cargo. For instance, the cross bars 40, 50 and 60 could be installed on the surface, or recessed within the surface, of the rear compartment of a minivan or sport utility vehicle. Finally, the cross bars 40, 50 and 60 could be used in the rear bed of a pickup truck to secure loads.

Continuing, the roof rack cross bars 40, 50 and 60 are shown mounted on the top of the roof 20 of the vehicle 10; however, the cross bars 40, 50 and 60 may be mounted below the surface of the roof 20 to provide reduced wind resistance compared to their actual mounting on the surface of the roof. FIG. 2 depicts an installation, in which the cross bars 40, 50 and 60 are mounted below the surface of the roof 20. As can be seen in FIG. 2, because the roof rack cross bars 40, 50 and 60 are mounted below the surface of the vehicle roof 20, the roof rack system 30 permits the overall aerodynamics of the vehicle 10 to be as they would be, or nearly so, if the vehicle 10 and the roof 20 did not have the roof rack system 30. Stated another way, the advantage of having the roof rack cross bars 40, 50 and 60 below the surface of the roof 20 is that the cross bars 40, 50 and 60 create no, or very little, aerodynamic drag across the surface of the roof 20. Additionally, when the cross bars are mounted below the level of the roof, the vehicle is more aesthetically pleasing. Additionally, the cross bars provide structural rigidity to the vehicle.

With specific reference to FIG. 3, a situation exists in which the roof rack cross bars 40, 50 and 60 are installed on top of the roof 20 of the vehicle 10. In a roof rack system in which the cross bars 40, 50 and 60 are installed on top of a vehicle roof 20, the vehicle 10 may not have the same aerodynamics as a vehicle in which the roof rack system 30 is recessed within the roof, as depicted in FIG. 2. Despite any difference in vehicle aerodynamics, the roof rack cross bars 40, 50 and 60 are themselves aerodynamic. While it is perceived that many vehicles could be factory-ordered with a factory-installed, recessed roof rack system 30, it is also recognized that vehicle purchasers will order a vehicle with no roof rack and then desire to add a roof rack at a later date as an aftermarket item. Still others may purchase a vehicle used with no roof rack and then desire to add a roof rack as an aftermarket item. In an aftermarket addition situation, the roof rack system 30 will be as depicted in FIGS. 1 and 3. This installation on the surface of the vehicle roof is a simple and effective installation for those desiring a roof rack as an aftermarket item.

Turning now to FIGS. 1 through 7B, a more detailed explanation of an individual cross bar and its operative workings will be provided. While the roof rack system 30 is shown possessing three roof rack cross bars 40, 50 and 60, description of a single cross bar 40, the others of which are normally identical, will primarily be the focus of the following description. Additionally, while FIGS. 1 through 3 show three roof rack cross bars 40, 50 and 60, the teachings of the present invention are not limited to such, and as a result, any number of cross bars may be used on the roof of a vehicle depending upon the size of the particular vehicle in question. Furthermore, while the cross bars 40, 50 and 60 are shown on the roof of a vehicle 10, they may located on virtually any vehicle or on any non-vehicular surface where securing items is required.

Figure 4:
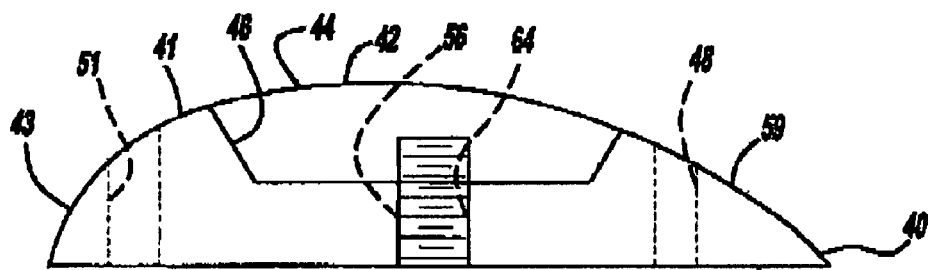
FIG. 4 is an end view of a roof rack cross bar in its retracted position according to the teachings of the present invention.
Figure 5:
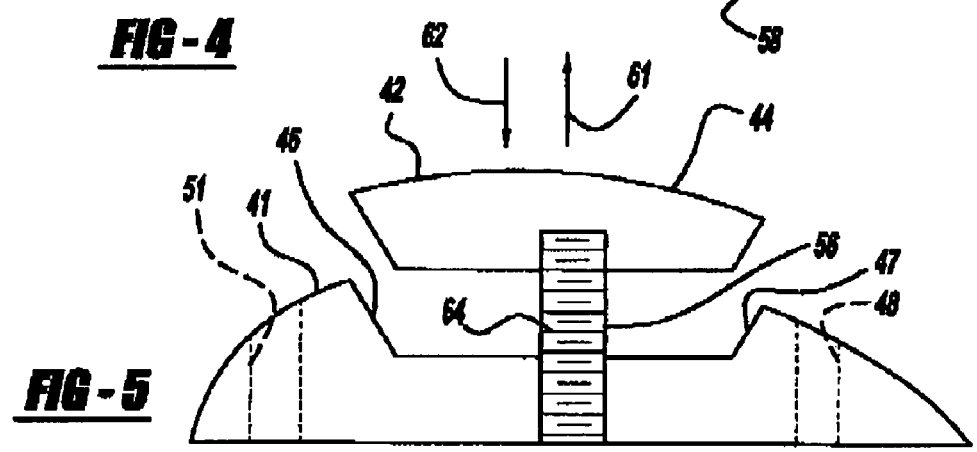
FIG. 5 is an end view of the roof rack cross bar in its protracted position according to the teachings of the present invention.
Figure 6:
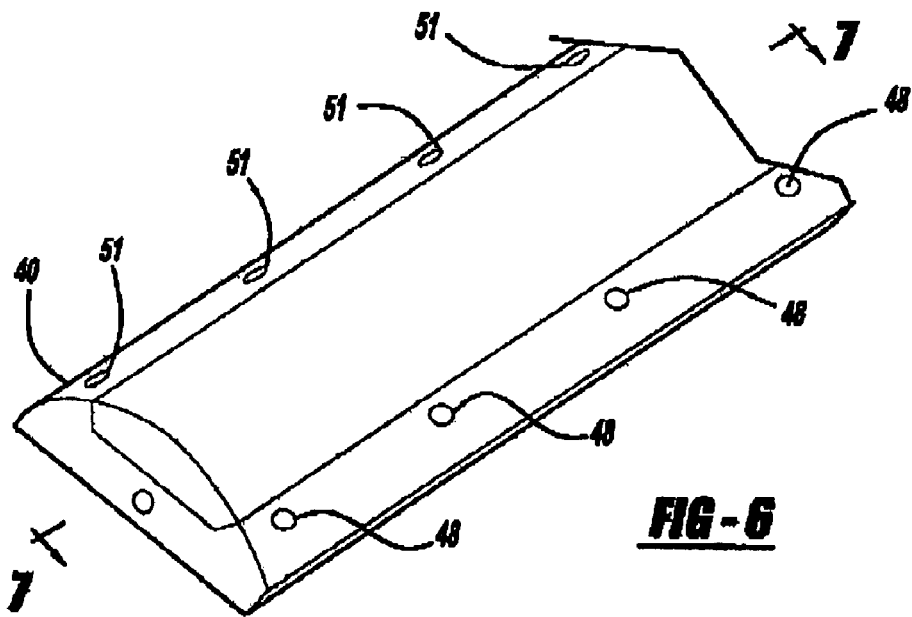
FIG. 6 is a perspective view of a roof rack cross bar according to the teachings of the present invention.

FIGS. 4 and 5 depict a roof rack cross bar 40 that has a leading surface 59, trailing surface 43, bottom surface 58 and a top surface 42. As depicted in FIG. 4, the leading surface 59 of the cross bar 40 is designed to form a smaller angle with the bottom surface 58 of the cross bar as compared to the trailing surface 43 of the cross bar 40 so that the cross bar 40 remains relatively aerodynamic when it is mounted on top of a vehicle roof 20, as depicted in FIGS. 1 and 3, as opposed to when the cross bar 40 is mounted below the vehicle roof 20, in which case the aerodynamics are improved, as depicted in FIG. 2.

While the cross bar 40 depicted in FIG. 4 can be mounted below the level of the roof 20, as in FIG. 2, the cross bar 40 may have its exterior contour changed to more advantageously take advantage of vehicle aerodynamics. To do this, the top surface 42 of the cross bar 40 may be designed to perfectly match the roof contour of the vehicle 10.

Continuing, the cross bar 40 has a base member 41 and a top member 44, also known as a retractable mounting member 44. The base member 41 has a front fastener hole 48 and a rear fastener hole 51. The front and rear fastener holes 48, 51 are through holes bored through the leading surface 59 and the trailing surface 43, respectively. In order to secure the cross bar 40 to the surface on which it will be used to secure materials, any type of fastener such as a bolt, screw, cap screw, rivet, etc. may be used to secure the cross bar 40 to the roof 20 or mounting surface. Additionally, in certain applications, dictated by the load to be secured and the speed at which the load will be passed through a medium, such as air, the cross bar 40 may be secured to its surface by an adhesive.

Within the cross bar 40, a biasing means such as a spring 64 is used to force the mounting member 44 from its mounting member seat 46, which is its retracted, not-in-use position, to its protracted, in-use position as shown in FIG. 5. The spring 64 is typically a coil spring, but may be any type of spring or pliable member, and is housed in a spring case 56 within the base member 41 and the mounting member 44, as depicted in FIGS. 4 and 5. In order to accommodate the spring case 56 within the base member 41 and the mounting member 44, the spring case 56 can be made in two pieces, a top piece and a bottom piece such that one piece overlaps or encompasses the other such that, for example, the top piece overlaps the bottom piece with the top piece being secured within the bottom piece when the spring is compressed. The spring case 56 made be made of a rigid tubular material or a soft, pliable material in which case the material could collapse upon itself in an accordion fashion when the top member 44 is in its retracted position.

When the spring 64, or associated biasing means, is activated, the mounting member 44 is forced perpendicularly away from the roof 20, as depicted by force arrow 61. When a user desires the mounting member 44 to not be protracted any longer, such as after a load securing task is complete, the mounting member 44 is forced in the direction of arrow 62 by the muscular force of the user, so that the mounting member 44 biases against the force of the spring 64 and then secures into its retracted position within the base member 41. Securing the mounting member 44 within the base member 41 can be accomplished in any number of ways, by a lock mechanism or the like connected to and working in conjunction with the release rod 55 within the release rod hole or rod cavity 54, and the push button 52 within the push button hole 53 (FIGS. 7A and 7B).

With additional reference to FIGS. 7A and 7B, in order to release mounting member 44 from its base member 41, a push button 52, resident in a push button hole 53, is pressed. The push button 52 is operatively connected to a release rod 55 that is resident within a release rod hole 54. The release rod 55 works operatively with the spring 64 so that the spring energy is capable of being released when the button 53 is pressed. The push button 52 or push button hole 53 also contains a spring 66 or biasing mechanism in order to return the push button 52 to its normal position so that the top surface of the push button 52 is approximately flush with the base member 41. While the above explains the operative workings of the cross bar 40, the way in which the cross bar 40 may be used as part of a larger roof rack system 30 will now be explained.

When a user desires to use the retractable cross bar 40, he or she normally stands outside of the vehicle on which it is installed. FIG. 1 depicts a vehicle 10 on which the cross bars 40, 50 and 60 are installed. Cross bar 60 is shown in its retracted position while cross bars 40, 50 are shown in their protracted position. When a user approaches the vehicle 10, the cross bars 40, 50 and 60 are normally in the retracted position as shown in cross bar 60. To cause the retracted cross bar 60 to move to its protracted position, as shown in cross bars 40, 50 of FIG. 1, and in FIG. 5, the push button 52 is pressed. The cross bar push button 52 can easily be accessed by a user standing at the side of the vehicle 10. Upon pressing the button 52, the release rod 55 moves in such a way to release the energy of the spring 64 to release the mounting member 44 from the base member 41 so that a gap 47 forms between the mounting member 44 and the base member 41. While the gap 47 is shown in FIG. 5 when the mounting member 44 is fully protracted, the gap 47 could be of various sizes since the distance the mounting member 44 is permitted to protract could be made to be adjustable.

FIGS. 7A and 7B each depict a cross-sectional view of a latching mechanism according to one aspect of the teachings of the present invention. In order for a user to release the mounting member 44 from its retracted position as shown in FIG. 7A, he or she pushes the button 52, located at the end of the base member 41, in the direction of arrow 57. In so doing, the button spring 66 biases against the spring rest 68 which also causes the release rod 55, guided by rod guides 56, to move in the direction of arrow 57. This action causes the latch post 72, which is connected to the release rod 55, to also move in the direction of arrow 57, which in turn causes the latch 70 to move off of the lower surface or latching surface 73 of the latch cavity 74. When this occurs, the mounting member 44 is no longer secured in its retracted position and it is permitted to protract due to the force of the spring 64, to the extent that either the spring 64 or the spring case 56 will permit. The spring case 56 is an optional piece that may be rigid, but collapsible, or soft and pliable to permit changes in the case 56 shape to accommodate retraction and protraction of the spring 64. As the latch post or latching element 72 is moved, the latch 70 is moved off of the lower surface 73, and the latch 70 may or may not contact a wall 82 of the mounting member 44. When the mounting member 44 is in its protracted position, the spring 64 is in an extended position.

When the mounting member 44 is desired to be moved from its protracted position of FIG. 7B to its retracted position of FIG. 7A, the top of the mounting member 44 is simply pressed by a user so that a surface 80 of the latch 70 contacts a wall 82 of the entrance path to the latch cavity 74. When this contact occurs, the latch post 72 may bias in the direction of arrow 76 and then bias in the direction of arrow 78 as the latch 70 rests upon the lower surface 73 of the latch cavity 74. In this retracted position, the spring 64 is compressed. Retraction of the mounting member 44 by simply pressing the top of the mounting member 44, causing the spring 64 to retract, is another advantage of the teachings of the present invention.

Continuing with retraction of the mounting member 44, the closing force necessary, per spring, to retract the mounting member 44 will be more than the force per spring that causes the mounting member 44 to be resident in its protracted position. That is, by example only, if 40 pounds per spring is biasing the mounting member 44 when the mounting member 44 is in its protracted position, then a user would need to begin with 40 pounds of force in order to retract that spring. Absent a device to lend a mechanical advantage, this force would increase until the spring was compressed and the mounting member 44 was finally retracted.

In an alternative embodiment regarding the adjustment of the spring 64, a thumb wheel (not shown) or an adjustment knob (not shown) could be used to adjust the compression of the spring in order to increase or decrease the load with which the spring biases the mounting member 44. This would allow the user to adjust the loading or compression amount of the spring 64 in accordance with the load to be applied on the top of the rack. In any load securing event; however, the preferred method of attachment of a package to the mounting member 44 is by using a rope or fastening strap 45 and passing the rope or strap 45 between the mounting member 44 and the base member 41 and then passing the rope or strap 45 over the package or cargo as shown in FIG. 1. With this method, the package will be adequately secured and since the strap 45 passes between the mounting member 44 and the base member 41, there is no opportunity for the mounting member 44 to retract into the base member 41 during a cargo transport event. The advantage of this arrangement is that in the event the weight and motion of the vehicle causes the cargo to vertically oscillate or move, there is no opportunity for the mounting member 44 to retract into the base member 41.

Continuing, the advantages of the cross bar 40, and roof rack, as described in the above description and shown in the accompanying drawings, are numerous. An advantage is that protraction and retraction of the cross bar, that is, protraction and retraction of the mounting member 44 relative to the base member 41, can be accomplished by one person standing at just one side of the vehicle 10 and simply pushing a button, or in the alternative, standing on the floor of the vehicle 10, just inside the door of the vehicle and pressing the button at the end of the cross bar. Alternatively, the mounting member could be released remotely from inside the vehicle 10 using mechanical, electrical or electronic means. These advantages greatly contrast prior art roof racks that must be adjusted on each side of the roof rack, individually, to effectuate any rack adjustment.

A further advantage is that the contour of the base member 41 and mounting member 44, and the retraction of the mounting member 44 within the base member 41, are aerodynamically advantageous to the vehicle 10 such that wind drag and noise are reduced, which results in increased fuel economy. Still yet another advantage of the cross bars 40, 50 and 60 is that they permit cargo to be carried without the use of any longitudinal bars that traditionally join the ends of the cross bars. This is evident in FIG. 1 that depicts cargo package 49 secured by a cargo strap 45 that is tied around the mounting member 44.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roof rack comprising:
   a base member defining a recession;
   a top member that is retractable to a first position within the recession defined by the base member; and
   a spring, a first end of which is connected to and perpendicular to the base member and a second end of which is connected to and perpendicular to the top member, wherein the spring biases the top member away from the base member,
   the base member further including a rod cavity;
   the top member further including a latch cavity opening into the rod cavity and having a latching surface therein;
   a release rod positioned in the rod cavity for longitudinal movement therein; and a latching element coupled to the release rod and extending into the latch cavity, the latch element carrying a latch operative to engage the latching surface in a first longitudinal position of the release rod wherein the spring is compressed, and operative to clear the latching surface in a second longitudinal position of the release rod wherein the spring is extended.

2. The roof rack of claim 1, further comprising a spring casing that encompasses the spring to limit extension of the spring and protraction of the top member, wherein the spring case is flexible.

3. The roof rack of claim 1, wherein the spring is encapsulated by a spring case that limits the amount of protraction of the top member.

4. The roof rack of claim 1, wherein the base member has a leading surface that has a slope that is different than a slope of a trailing surface, with respect to a bottom surface of the base member.

5. The roof rack of claim 1, wherein the top member and the base member define a gap therebetween when the top member is in its protracted position.

6. A cargo rack for an automobile comprising:
a base member having a flat bottom surface and a rod cavity;
a top member that is retractable to a first position within the base member and protractable to a second position such that the top member disengages the base member and forms a gap therebetween, the top member further including a latch cavity opening into the rod cavity and having a latching surface therein;
a spring for biasing the top member away from the base member, wherein the spring biases against the base member to move the top member from a stowed position toward a protracted position;
a spring case encompassing the spring, the spring case limiting extension of the spring and protraction of the top member; and
a release rod, wherein the release rod is releasably engaged by the latch surface and an end of the release rod is coupled to a push button which effects movement of the release rod into and out of engagement with the latch surface.

7. The cargo rack of claim 6, wherein the top member has a curved outer periphery.

8. The cargo rack of claim 7, the base member further comprising:

a first angled flat surface proximate to a leading surface of the base member;
a second angled flat surface proximate to a trailing surface of the base member; and
a flat surface that is parallel to the flat bottom surface, wherein the first and second angled flat surfaces intersect the flat surface.

9. The cargo rack of claim 8, the top member further comprising:
a front angled flat surface, a rear angled flat surface, and a bottom flat surface, each respectively contacting the first angled flat surface, the second angled flat surface and the bottom flat surface of the base member when the top member is in its retracted position within the base member.

10. The cargo rack of claim 9, wherein the spring case is flexible.

11. The cargo rack of claim 10, wherein the leading surface of the base member has a slope that is different than a slope of the trailing surface with respect to a bottom surface of the cross bar.

12. The roof rack of claim 1 further comprising an actuator coupled to one end of the release rod for effecting movement of the release rod between the first and second positions.

13. The roof rack of claim 12 wherein the actuator comprises a spring-biased push button.

14. The roof rack of claim 1 wherein the base member and the top member are elongated elements adapted to be placed on a vehicle roof so as to extend from one lateral side of the vehicle roof to an opposite lateral side of the vehicle roof and wherein the rod cavity of the base member extends substantially throughout a length of the base member and wherein the top member includes a plurality of latch cavities each opening into the rod cavity, each having a latching surface therein; each carrying a latching element coupled to the release rod and extending into the latch cavity, each latching element carrying a latch for engagement with and release from a corresponding latching surface in accordance with longitudinal positions of the release rod.

15. The roof rack of claim 14 further comprising an actuator coupled to one end of the release rod for varying longitudinal positions thereof.

16. The roof rack of claim 15 wherein the actuator comprises a spring-biased push button.

* * * * *